United States Patent Office 3,376,128
Patented Apr. 2, 1968

---

3,376,128
4,5-DIMERCAPTOPYRIDAZONES
Franz Reicheneder, Ludwigshafen (Rhine), Germany, Karl Dury, deceased, late of Kirchheimbolanden, Germany, by Johanna Maria Dury, heiress-at-law, Kirchheimbolanden, Germany, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Dec. 21, 1965, Ser. No. 515,491
Claims priority, application Germany, Dec. 29, 1964, B 79,923
3 Claims. (Cl. 71—90)

This invention relates to new dithiopyridazone derivatives. It relates in particular to dithiopyridazone derivatives having good herbicidal action. It relates further to pyridizaone derivatives which are suitable for destruction of unwanted vegetation growing among crop plants without damaging the latter.

It is an object of this invention to provide new dithiopyridazone derivatives.

Another object of the invention is to provide dithiopyridazone derivatives having valuable herbicidal properties.

A further object of the invention is to provide a process for destroying unwanted vegetation with dithiopyridazone derivatives.

Yet a further object of the invention is to provide a process for controlling unwanted vegetation with dithiopyridazone derivatives without damaging the crop plants among which the unwanted vegetation is growing.

It is known that pyridazone derivatives, for example 1-phenyl-4-thiomethyl-5-chloropyridazone-6, may be used to control weeds. The activity of the said compound is however unsatisfactory.

We have found that pyridazones having the general formula

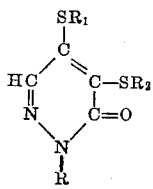

in which R denotes a hydrogen atom, methyl, an unsubstituted or substituted cycloalkyl radical or an unsubstituted or substituted phenyl radical, $R_1$ denotes a lower saturated or unsaturated alkyl radical which may bear chlorine as a substituent, a substituted or unsubstituted phenyl radical, an unsubstituted or substituted aralkyl radical, a cycloalkyl radical or the radical of tetrahydrofuran, benzothiazole or acetic acid, and $R_2$ is identical with or different from $R_1$ and has the same meanings as $R_1$, have good herbicidal activity.

Unsubstittued or substituted phenyl radicals include the phenyl radical itself and phenyl radicals bearing chlorine atoms, bromine atoms, fluorine atoms, methyl radicals, —O-methyl radicals, —O-ethyl radicals or nitro radicals once or twice as substituents.

Unsubstituted or substituted cycloalkyl radicals include cyclopentyl, cycloheptyl and particularly cyclohexyl, cyclooctyl and cyclododecyl radicals and these radicals bearing chlorine atoms, methyl groups or hydroxyl groups once or twice as substituents.

Lower alkyl radicals are defined as alkyl radicals having one to five, preferably one or two, carbon atoms, and unsubstituted or substituted aralkyl radicals include the benzyl radical, the phenyl-ethyl radical and these radicals bearing chlorine atoms once or twice as substituents.

The particular advantage of the new active substances over prior art pyridazone derivatives lies in their considerably more rapid and better initial and total herbicidal action, particularly against annual grasses. The selective action of these new compounds with respect to crop plants, for example Indian corn and potatoes, is particularly valuable.

The active substances may be prepared by reaction of the corresponding 4,5-dichloropyridazone derivatives with alkylmercaptans, aralkylmercaptans, thiophenols, thiocarboxylic acids and heterocycles containing sulfhydryl groups.

The following are given as examples of the preparation of two of the substances:

1-phenyl-4,5-di-(thiocyclohexyl)-pyridazone-(6)

16.5 parts (by weight) of 1-phenyl-4,5-dibromopyridazone-(6), 11.5 parts of cyclohexylmercaptan and 150 parts of ethyl alcohol are heated to 40° to 50° C. While shaking continually, 6 parts of potassium hydroxide is added and the mixture is allowed to boil on a steam bath for about half an hour. The product is cooled and diluted with water and 19 g. of 1-phenyl-4,5-di-(thiocyclohexyl)-pyridazone-(6) crystallizes out. It melts at 80° to 82° C. after it has been recrystallized from petroleum ether.

1-phenyl-4,5-di-(thiotrichloroallyl)-pyridazone-(6)

24 parts of 1-phenyl-4,5-dichloropyridazone-(6), 43 parts of trichloroallylmercaptan $$(HS—CH_2—CCl=CCl_2)$$

400 parts of acetone and 28 parts of potassium carbonate are boiled under reflux for one hour. Then some of the acetone is distilled off and the remaining mixture is diluted with about 500 parts of water. 45 parts of 1-phenyl-4,5-di-(thiotrichloroallyl)-pyridazone-(6) is obtained which melts at 79° to 81° C. after it has been recrystallized from benzene and from ethyl alcohol.

The following list gives some of the active substances having the general formula

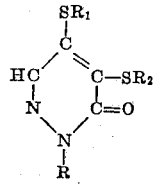

in which R, R₁ and R₂ have the meanings indicated below:

| R | R₁ | R₂ | Melting point in °C. |
|---|---|---|---|
| Phenyl | Methyl | Methyl | 114–116 |
| Phenyl | Ethyl | Ethyl | 74–76 |
| Hydrogen | Phenyl | Phenyl | 162–164 |
| Hydrogen | Ethyl | Ethyl | 151–152 |
| Methyl | Methyl | Methyl | 100–101.5 |
| Phenyl | Phenyl | Phenyl | 164–165 |
| Phenyl | 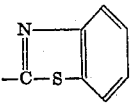 | 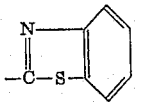 | 157–158 |
| Phenyl | Benzyl | Benzyl | 115–117 |
| Phenyl | —CH₂COOH | —CH₂COOH | 188–190 |
| Phenyl |  |  | 128–129 |
| Phenyl |  | 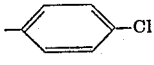 | 123–125 |
| Phenyl |  | 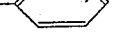 | 128–129 |
| Phenyl | 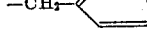 |  | 154–156 |
| Cyclohexyl | Methyl | Methyl | 103–104 |
| 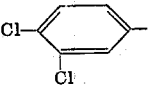 | Methyl | Methyl | 167–169 |
| 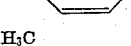 | Methyl | Methyl | 150–152 |
| 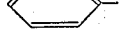 | Methyl | Methyl | 118–120 |
| Cyclooctyl | Methyl | Methyl | 62–64 |
| 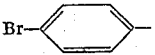 | Methyl | Methyl | 142–143 |
| 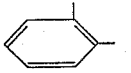 | Methyl | Methyl | 137–139 |
| Phenyl | Cyclohexyl | Cyclohexyl | 80–82 |
| Phenyl | —CH₂—CCl=CCl₂ | —CH₂—CCl=CCl₂ | 79–81 |

Herbicides in accordance with this invention may be used in the form of solutions, emulsions, suspensions or dusting powders. The form in which they are used depends entirely on the intended purpose; it is only necessary that all forms should ensure fine dispersion of the active substance.

The scope of application of the new agents according to this invention may be varied by adding substances having bactericidal, fungicidal or plant growth regulating properties and by mixing them with fertilizers.

The following examples illustrate the use of the herbicides.

EXAMPLE 1

The plants Indian corn (Zea mays), cotton, onions, peas, beans, a mixture of annual grasses and a mixture of weeds consisting of sorrel (Rumex spp.), white goosefoot (Chenopodium album), small nettle (Urtica urens), camomile (Matricaria chamomilla) and chickweed (Stellaria media) are sown in plastics pots having a diameter of 8 cm. and sprayed on the same day with 1-phenyl-4,5-dithiomethylpyridazone-(6) (I) and, for comparison with 1-phenyl-4-thiomethyl-5-chloropyridazone-(6) (II) at a rate of 3 kg. of active substance suspended in 500 liters of water per hectare.

Three weeks later it is found that active substance I has a better herbicidal action on the above-mentioned weeds and annual grasses than active substance II, being at the same time compatible with Indian corn.

The results of the test may be seen from the following table in which 0=no damage and 100=total destruction:

| | Active substance | |
|---|---|---|
| | I | II |
| Indian corn | 0 | 0 |
| Cotton | 0 | 0 |
| Onions | 0 | 0 |
| Peas | 0 | 5 |
| Beans | 0 | 0 |
| Weed mixture | 90–100 | 50–60 |
| Annual grasses | 70–90 | 20–30 |

The following have the same biological action as I:

1-phenyl-4',5-dithiomethylpyridazone-(6)
1-phenyl-4',5-dithiophenylpyridazone-(6)
1-cyclohexyl-4',5-dithiomethylpyridazone-(6).

EXAMPLE 2

Potatoes (*Solanum tuberosum*), Indian corn, cotton, peas, beans, annual grasses and a mixture of weeds consisting of sorrel (Rumex spp.), white goosefoot (*Chenopodium album*), mustard (*Sinapis alba*), small nettle (*Urtica urens*) and camomile (*Matricaria chamomilla*) are sprayed in the greenhouse at a growth height of 4 to 17 cm. with 1-phenyl-4,5-dithiomethylpyridazone-(6) (I) and, for comparison, with 1-phenyl-4-thiomethyl-5-chloropyridazone-(6) (II) at a rate of 3 kg./ha. of active substance suspended in 500 liters of water per hectare.

Three weeks later it is found that active substance I has a considerably better herbicidal action on the various weeds and annual grasses than active substance II. No damage to the potatoes is observed. The results of the experiment are to be seen in the following table in which again 0=no damage and 100=total destruction:

|              | Active substance |       |
|--------------|------------------|-------|
|              | I                | II    |
| Potatoes     | 0                | 0     |
| Indian corn  | 0                | 0-10  |
| Cotton       | 0                | 0     |
| Peas         | 0                | 0-10  |
| Beans        | 5                | 10    |
| Weed mixture | 90-100           | 50-60 |
| Annual grasses | 80-90          | 30-40 |

The following compounds have the same biological action as active substance I:

1-phenyl-4',5-dithiomethylpyridazone-(6)
1-phenyl-4',5-dithiophenylpyridazone-(6)
1-cyclohexyl-4',5-dithiomethylpyridazone-(6).

We claim:
1. A compound having the formula

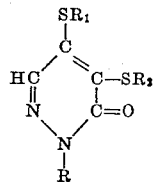

in which R denotes a member selected from the group consisting of hydrogen, methyl, phenyl, cyclohexyl, cyclooctyl,

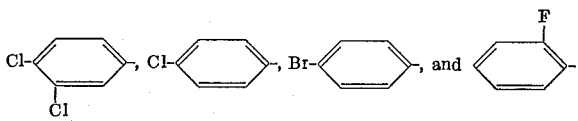

$R_1$ methyl, ethyl, phenyl, benzyl,

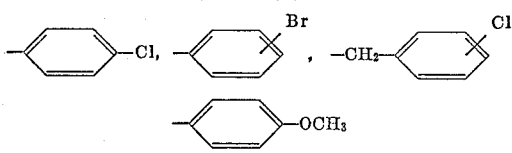

—$CH_2$—$CCl$=$CCl_2$, cyclohexyl, the radical of tetrahydrofuran, the radical of benzothiazole, and the radical of acetic acid, and $R_2$ has the same meanings as $R_1$.

2. A method of regulating plant growth which comprises treating the soil with a phytotoxic amount of a compound as claimed in claim 1.

3. A method of regulating plant growth which comprises treating the plants with a phytotoxic amount of a compound as claimed in claim 1.

References Cited

UNITED STATES PATENTS 3,137,696   6/1964   Reicheneder et al. ___ 260—250

NICHOLAS S. RIZZO, *Primary Examiner.*